US011906942B2

(12) United States Patent
Jin et al.

(10) Patent No.: US 11,906,942 B2
(45) Date of Patent: Feb. 20, 2024

(54) POWER GRID CONTROLLER DEVICE AND SYSTEM

(71) Applicant: HYOSUNG HEAVY INDUSTRIES CORPORATION, Seoul (KR)

(72) Inventors: Bo Gun Jin, Anyang-si (KR); Dae Geun Jin, Incheon (KR); Jae Sun Huh, Anyang-si (KR)

(73) Assignee: HYOSUNG HEAVY INDUSTRIES CORPORATION, Seoul (KR)

( * ) Notice: Subject to any disclaimer, the term of this patent is extended or adjusted under 35 U.S.C. 154(b) by 304 days.

(21) Appl. No.: 17/312,267

(22) PCT Filed: Nov. 15, 2019

(86) PCT No.: PCT/KR2019/015663
§ 371 (c)(1),
(2) Date: Jun. 9, 2021

(87) PCT Pub. No.: WO2020/130366
PCT Pub. Date: Jun. 25, 2020

(65) Prior Publication Data
US 2022/0035328 A1 Feb. 3, 2022

(30) Foreign Application Priority Data
Dec. 18, 2018 (KR) .................. 10-2018-0164605

(51) Int. Cl.
*G05B 19/042* (2006.01)
(52) U.S. Cl.
CPC .... *G05B 19/042* (2013.01); *G05B 2219/2639* (2013.01)

(58) Field of Classification Search
CPC . G05B 19/042; G05B 2219/2639; H02J 3/38; H02J 2203/20; H02J 2300/20; H02J 2310/10; H02J 13/00006; H02J 3/381; H02J 3/003; H02J 3/004; H02J 3/00; Y02E 40/70; Y02E 60/00; Y04S 10/123; Y04S 40/20
See application file for complete search history.

(56) References Cited

U.S. PATENT DOCUMENTS

2016/0006245 A1* 1/2016 Chow ................. H02J 3/14
700/291
2016/0141877 A1* 5/2016 Bamberger ............. H02J 3/381
307/24
(Continued)

FOREIGN PATENT DOCUMENTS

KR       10-1214323 B1    2/2013
KR    10-2013-0130986 A    12/2013
(Continued)

*Primary Examiner* — Charles Cai
(74) *Attorney, Agent, or Firm* — NKL Law; Jae Youn Kim

(57) ABSTRACT

A power grid control device of the present invention may comprise: a grid input interface for receiving an input of information on an operation state of a power grid; a grid output interface for outputting a signal for operating the power grid; a communication interface for performing data communication with a remote device; a component unit in which a plurality of software components for performing individual functions required for operating the power grid are stored; and a processing module for executing the components to process a work required for the operation of the power grid.

6 Claims, 5 Drawing Sheets

(56) References Cited

U.S. PATENT DOCUMENTS

2018/0113940 A1* 4/2018 Mora López ........... G06F 16/00
2018/0238575 A1* 8/2018 Park ....................... G05B 15/02

FOREIGN PATENT DOCUMENTS

| KR | 10-2018-0075273 A | 7/2018 |
| KR | 10-2018-0110881 A | 10/2018 |
| WO | 2018-122726 A1 | 7/2018 |

* cited by examiner

POWER GRID CONTROLLER DEVICE AND SYSTEM

FIELD OF THE INVENTION

The present invention relates to a power grid controller as one of plans for constructing an integrated infrastructure system to implement multiple distributed power grids, and more particularly to, scalable and selectable modular software technology for processing data in the power grid controller. In other words, it relates to the highly scalable and adaptable power grid controller capable of increasing interoperability across power grid from customers to a main system suitable for multiple distributed smart grid environments.

BACKGROUND OF THE INVENTION

Each power grid controller in a structure of multiple distributed power grids including smart grids need to internally process system configuration, home-area equipment management, pre-Validation, Estimation and Editing (Pre-VEE), feedback, VEE, reporting and billing data creation more complicatedly and more variously in addition to an automated data collection function in an automatic meter reading environment.

Through these, meter data should be managed and preliminary preparation for services should be made. However, the existing systems have been focused on how data is acquired and transferred, from which they did not have an appropriate structure for electric power companies to manage their businesses.

Furthermore, regarding how to process functions by relevant individual existing systems upon linkage therebetween, each function needs to be coordinated one to one. If the business environment of electric power companies is changing, the workload for adopting the system is large, and accordingly, the structure was inefficient upon customizing for system maintenance and overseas export.

Therefore, a power grid controller with a structure of shortening the development period of a program and designing a program stably while increasing the reusability of an already developed program is required. Besides, scalable design is also required to implement individual power grids, including smart grids, which reflect a variety of users' requirements.

DETAILED EXPLANATION OF THE INVENTION

Technical Problem

An object of the present invention is to provide an operation algorithm appropriate for a power grid controller capable of combining operation algorithms appropriate for a variety of operating conditions by using modularized microgrid operation algorithms.

The other object of the present invention is to provide a power grid controller capable of securing scalability and flexibly responding to customers' requirements by revising and re-applying only an algorithm if there is anything to be improved in the algorithm.

Means of Solving the Problem

A power grid controller in accordance with one aspect of the present invention may comprise: a grid input interface for receiving information on operating state of a power grid; a grid output interface for outputting a signal for operating the power grid; a communication interface for performing data communication with a remote device; a component unit with a plurality of software components for performing individual functions to operate the power grid; and a processing module for executing the components to process a work required to operate the power grid.

Herein, it may further comprise: a component managing unit for storing the components received from a remote management system server, deleting or adding the stored components, and changing order of execution.

Herein, the component managing unit may delete or add the components in the component unit or change the order of execution depending on a country or an administrative area where the power grid is installed and serviced, or on an electricity supplier of a superordinate power grid.

Herein, the processing module may process individual work required to operate the power grid in the implementation order of components classified by each process function, and transmit result of processing the individual work.

Herein, the components may be classified into a planning set for predicting power generation situations and load situations and planning operation strategies and operation schedules, and an operation set of controlling elements of the power grid depending on the operation schedule.

Herein, the planning set may include a power generation-forecasting group for foresting power generation amount of each power source included in the power grid from weather information received from outside and accumulated weather information; a load-forecasting group for forecasting power consumption of each load in the power grid form accumulated power consumption information; an analysis group for analyzing electricity transactions from the superordinate grid; and a power generation planning group for determining an optimal power generation schedule of a controllable power source.

Herein, the operation set may include a power-compensating group for performing a function of compensating power in the power grid; a grid control group for controlling a configuration of the power grid; a dispatch group for controlling output of the power source depending on the optimal power generation schedule and performing load shedding and linkage; and a monitoring group for monitoring operating state of the power grid.

A power grid control system in accordance with another aspect of the present invention may comprise: a grid power controller including a grid input interface for receiving information on operating state of a power grid, a grid output interface for outputting a signal for operating the power grid, a communication interface for performing data communication with a remote device, a component unit with a plurality of software components for performing individual functions to operate the power grid, and a processing module for executing the components to process a work required to operate the power grid; and a remote supporting server including a component database where components to be transmitted to the power grid controller, a communication interface for performing data communication with the power grid controller, a grid managing unit for performing a work of management of the power grid and the power grid controller, a grid database for storing information on management of the power grid and the power grid controller, a components-combining unit for configuring combinations of components to be provided to each power grid controller, and a component managing unit for managing components stored in the component database.

Effects of the Invention

A power grid controller of the present invention with the aforementioned configuration has a benefit of combining operation algorithms suitable for a variety of operating conditions by using modularized microgrid operation algorithms.

The power grid controller of the present invention has an advantage of securing easiness to extend functions to perform and flexibly responding to needs of customers and sites.

The power grid controller of the present invention has an advantage of revising any algorithm regarding to an improvement or error occurring and properly responding to such improvement or error.

DETAILED DESCRIPTION OF THE PREFERRED EMBODIMENTS

Detailed example embodiments to implement the present invention will be explained below by referring to attached drawings.

Upon the explanation of the present invention, terms such as "a first," "a second," etc. may be used to explain a variety of components but the components may not be limited by such terms. The terms are used only for the purpose of distinguishing one component from another. For example, a first component may be named as a second component without being beyond the scope of the right of the present invention and similarly, even a second component may be named as a first one.

If it is mentioned that a component is connected or linked to another component, it may be understood that the component may be directly connected or linked to the another component but also a third component may exist in between them. The terms used in this specification are used only to explain specific example embodiments and they are not intended to limit the present invention. Unless a context clearly indicates a different meaning, any reference to singular may include plural ones.

In this specification, terms such as include or equip are used to indicate that there are features, numbers, steps, operations, components, parts or combinations thereof, and it can be understood that existence or one or more different features, numbers, steps, operations, components, parts or combinations thereof are not precluded.

Besides, for clearer explanation, shapes, sizes, etc. of elements in drawings may be exaggerated.

Figure 1:
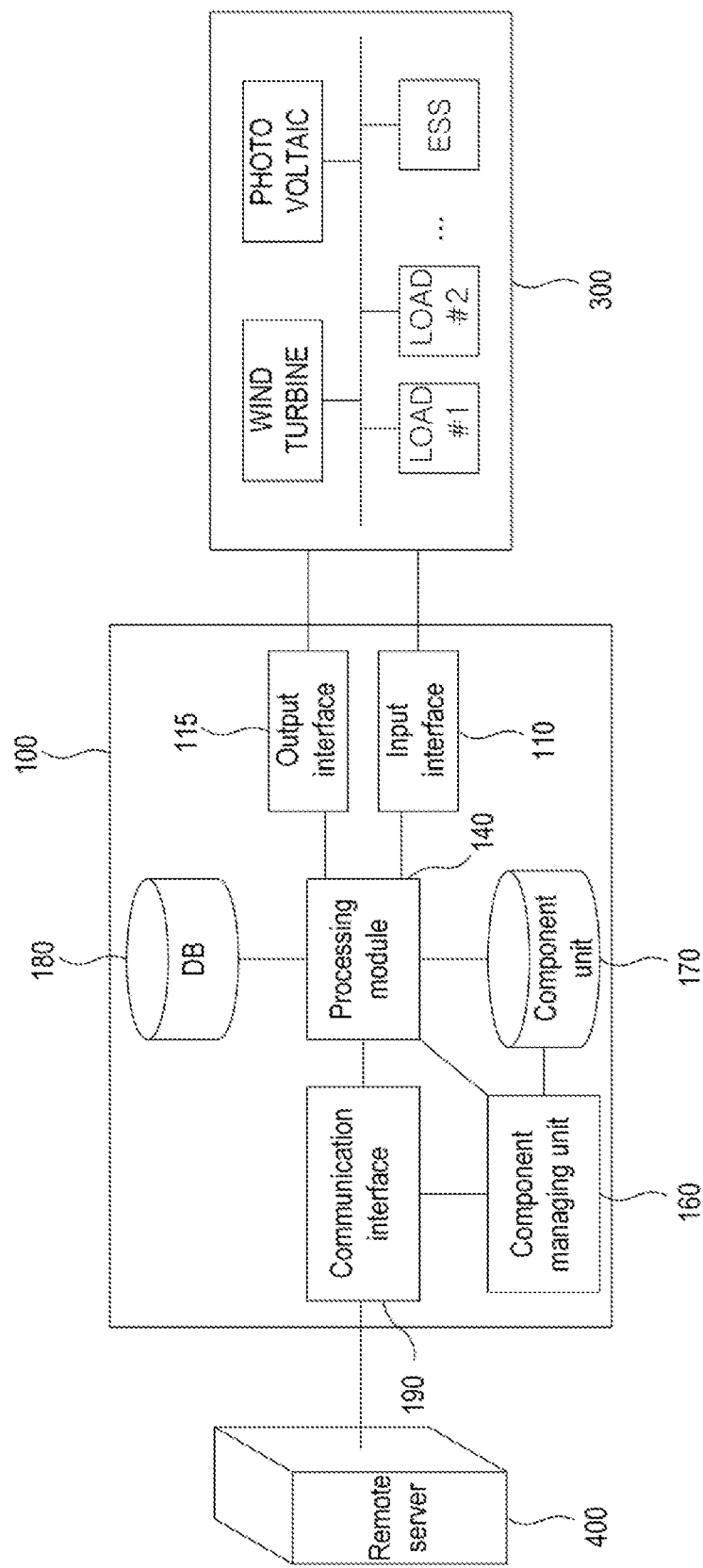
FIG. 1 is a block diagram illustrating one example embodiment of a power grid controller in accordance with the thought of the present invention.

FIG. 1 is a block diagram illustrating one example embodiment of a power grid controller in accordance with the thought of the present invention.

The illustrated power grid controller 100 may comprise: a grid input interface 110 for receiving information on operating state of a power grid 300; a grid output interface 115 for outputting a signal for operating the power grid 300; a communication interface 190 for performing data communication with a remote device 400; a component unit 170 with a plurality of software components for performing individual functions to operate the power grid 300; a component unit 170 with a plurality of software components for performing individual functions to operate the power grid 300; and a processing module 140 for executing the components to process a work required to operate the power grid 300.

Herein, the software components may be received from the software components from a remote management system server or component supporting server 400.

In accordance with the implementation, it may further comprise a component managing unit 160 for deleting or adding the components stored in the component unit 170 and changing order of execution. However, if the remote component supporting server performs implementation supporting a function of deleting and adding components stored in the component unit 170 or changing order of execution together, the component managing unit may be omitted.

Database 180 for storing data and information required to operate the power grid 300 such as data created as a result of processing the processing module 140, measurement information of the power grid 300 inputted from the grid input interface 110, order received from the remote device 400 or environment information may be further comprised.

In the database 180, access logs of administrators of the remote device 400 or elements of the power grid 300, and the power grid controller 100 may be stored.

The communication interface 190 is for long-distance data communication between the remote device 400 and the power grid controller 100.

The illustrated power grid 300 may be various forms of power grid. The present invention may be favorable, particularly, for a smart grid with sectioned power loads, small-sized power plants or energy storage systems (ESSs).

In accordance with the implementation, the power grid 300 may not only generate power to independently sectioned areas, and support loads but also supply remaining power, receive insufficient power, and participate in stabilization and power factor regulation of a wide area grid, being connected to the wider area grid. For example, the illustrated power grid 300 may include new and renewable energy equipment with ESSs independent from the superordinate grid to stabilize power may include a wind turbine (WT) and photovoltaic equipment (PV).

A grid control system for existing power grids such as smart grids has been individually designed and manufactured for the power grids. Not only hardware but also software of such grid control systems has been done like that.

In other words, meter data for the existing power grid was operated in a systematic structure of being collected through a Front End Processor (FEP), stored in database, and used case by case for request of application systems such as billing management system, if necessary.

The present invention has a component unit 170 for classifying and storing software components by process for each of individual functions required to operate the power grid 300. When the power grid controller 100 searches for a component required for its corresponding function at the component unit 170 and loads the searched component to the processing module 140, the each function is executed under a method of executing a process of the each function.

In accordance with the implementation, the processing module 140 may execute not only processes for controlling the power grid 300 but also applications supplied in the form of components by an external electricity supplier 400, etc. Herein, a power grid operated by an external electricity supplier may work as a superordinate grid to the power grid.

For example, the processing module 140 may create data to calculate electric power rates for smart metering by processing meter data collected from multiple automatic data collection systems and service data received from a remote meter data control server with the stored components.

In accordance with the implementation, the processing module 140 may process a plurality of components in a method of executing each processed function or process in a certain order. At the time, the order of execution by each component may be stored in the processing module 140, the component unit 170 or the component managing unit 160.

To execute the components stably in accordance with the implementation, the processing module 140 may include component interface, not illustrated, for managing information on start and end of each component, selecting and starting a component among the stored components to be executed next depending on information on the order of execution of stored components upon ending components being executed.

In accordance with the implementation, when a component is loaded in the processing module 140, the order of execution may be stored in identification data including a header of each component, but if information on the order of execution is separately managed, a configuration of controlling selection, execution and end of a component in the order of execution may be included.

In the component unit 170 and/or the processing module 140, components set as defaults may be stored upon being delivered for convenience of use. Users could add or delete components set as defaults or change the order of execution to use. Besides, in case of an implementation where the component managing unit 160 is omitted, only the components set as defaults may be stored in the component unit.

The component managing unit 160 which adds or deletes and manages a component responding to a necessary or unnecessary process may secure flexibility of the system and display an effect of being easily applied even to requirements of future overseas electricity suppliers. More specifically, meter data collected in serial order could be classified by each process to be applicable to a smart grid environment to be implemented in the future and make combinations of components specified in the order of execution executed.

In accordance with the implementation, the component managing unit 160 may have a form of software module for performing the function in a form of one or more default components recorded, loaded and executed.

The component managing unit 160 or the processing module 140 may search and select components to be used by the processing module 140 at the component unit 170 and transmit them to the processing module 140.

In accordance with the implementation, the component managing unit 160 may receive information on types of components to be executed from a remote administrator, e.g., electricity supplier and the order of execution of the components through the processing module 140. In this case, the component managing unit 160 or the processing module 140 may transmit the processed data to the remote administrator's device.

For example, the component managing unit 160 may execute other components depending on a country, a place, or an electricity supplier that will provide a smart metering service. Accordingly, the component managing unit 160 may delete or add components of the processing module 140 depending on the country, the place and the electricity supplier, or change the order of execution. In this case, the illustrated data management system, i.e., database, may further include logs and database to support functions of the component managing unit 160 and/or the processing module 140. The logs and the database may include the remote administrator's device, a data collection device of and a load device of the grid, and log information of the automatic data collection system. Accordingly, it would be possible to determine justification of each access by checking the information and accessibility, and to collect access information in real time.

The processing module 140 may receive as information on operating state of the power grid 300 through the grid input interface 110 grid voltage and current, information on state of charge of the ESS such as charge amount, SoC and SoH and information on power generation amount of the WT and the PV. The grid input interface 110 may perform functions of buffering the inputted signal, blocking nose mixed in the signal, and controlling electrical level of voltage and current of the signal.

Figure 2:
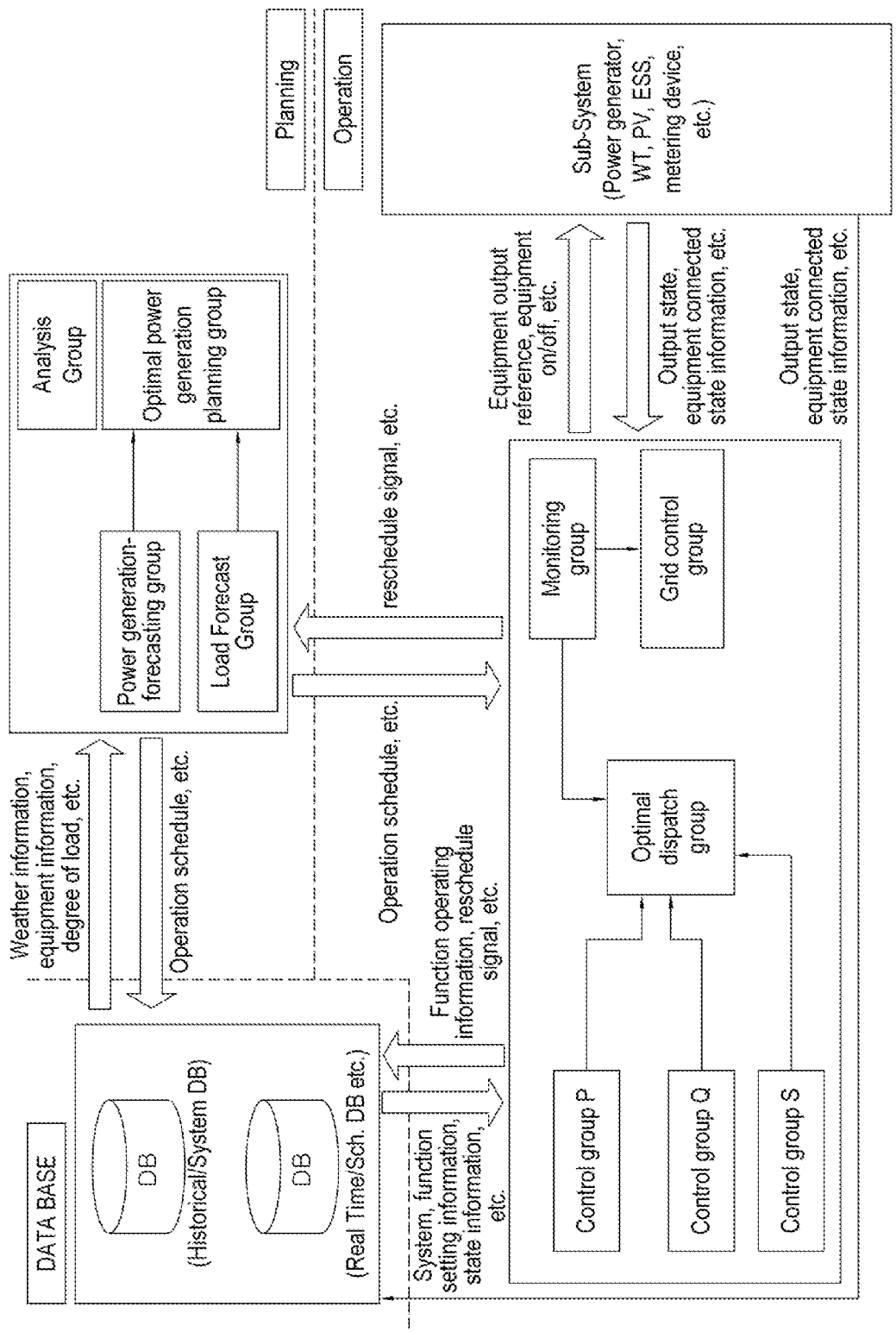
FIG. 2 is a concept diagram illustrating a mutual structure of a component by function in accordance with the thought of the present invention.

As an instruction for operating the power grid 300 through the grid output interface 115, the processing module 140 may output a signal for controlling a grid-blocking and connecting switch, a signal for controlling superordinate grid-blocking and connecting switch, an instruction for operating an ESS or an engine generator. The grid output interface 115 may perform functions of buffering the outputted signal, insulating a route for transmitting a signal, and controlling electrical level of voltage and current of the signal FIG. 2 is a concept diagram illustrating a mutual structure of a component by function in accordance with the thought of the present invention. In other words, FIG. 2 illustrates a component by each function having a mutual work handling relationship with another component.

In the drawing, the database is the database 180 in FIG. 1 and planning and operation are stored in the component unit 170 in FIG. 1, into which are largely classified the components loaded and executed in the processing module 140.

Figure 3:
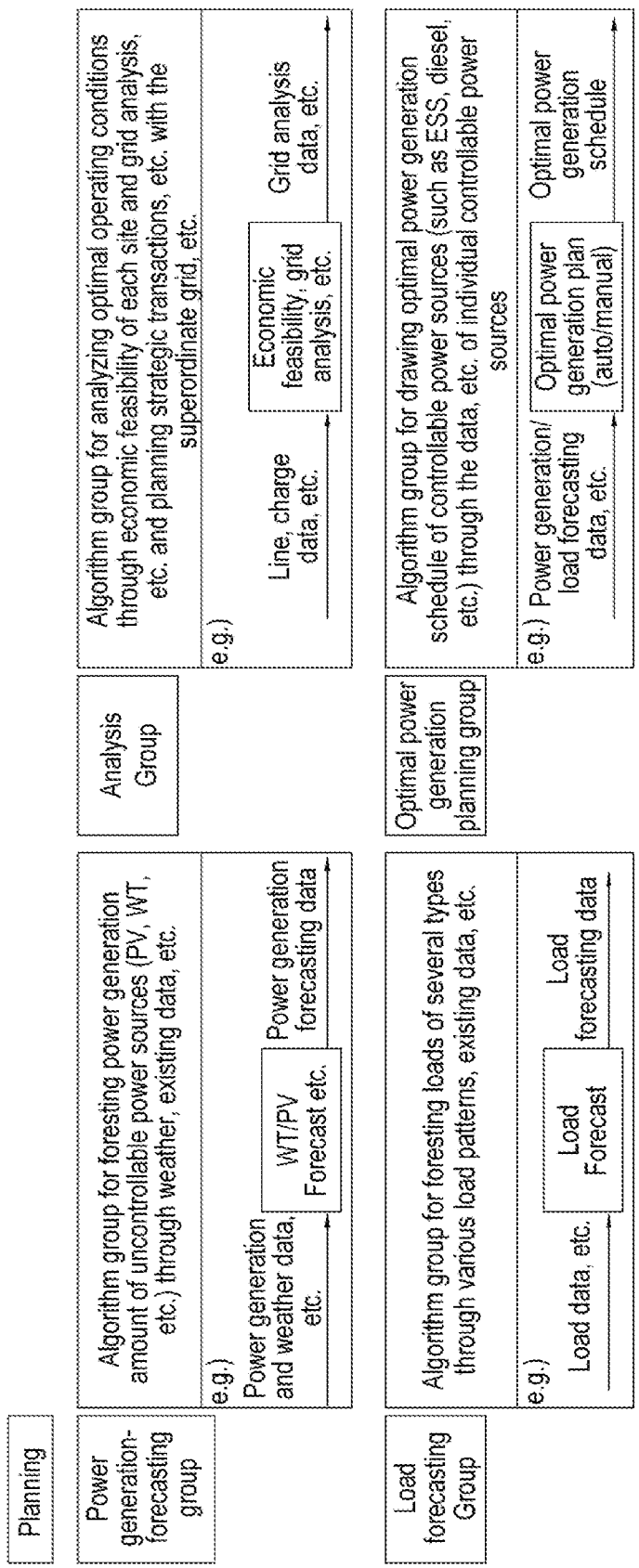
FIG. 3 is a concept diagram illustrating overview of functions of components included in a planning set.
Figure 4:
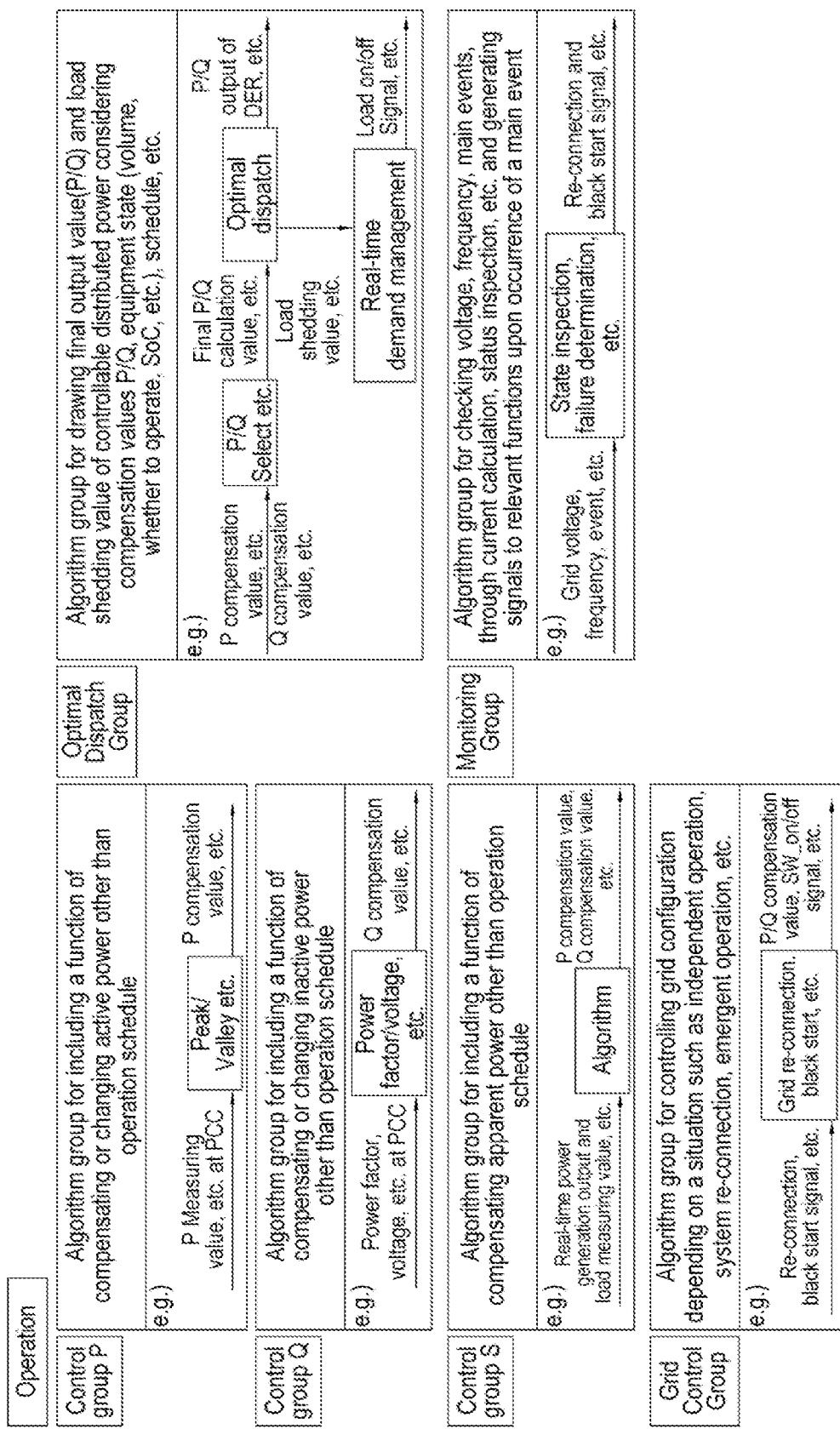
FIG. 4 is a concept diagram illustrating overview of functions of components included in an operation set.

FIG. 3 illustrates overview of functions of components included in a planning set, and FIG. 4 illustrates overview of functions of components included in an operation set.

The components in the planning set illustrated perform a function of predicting power generation situations and load situations and planning operation strategies and operation schedules.

The components of the illustrated operation set perform functions of controlling elements of the power grid depending on the operation schedules.

The components of the planning set may be more specifically subdivided into a power generation-forecasting group for foresting power generation amount of each power source included in the power grid from weather information received from outside and accumulated weather information; a load-forecasting group for forecasting power consumption of each load in the power grid form accumulated power consumption information; an analysis group for analyzing electricity transactions from the superordinate grid; and a power generation planning group for determining an optimal power generation schedule of a controllable power source Components in the power generation-forecasting group perform an algorithm of predicting power generation amount of a power source such as PV or WT uncontrollable through climate and existing data.

For example, a component for performing hourly predicted power generation amount of photovoltaic battery depending on hourly daylight amount acquired by analyzing weather information received from a remote device may be equipped.

For example, a component for performing hourly predicted power generation amount of a wind turbine depending on hourly wind volume acquired by analyzing weather information received from a remote device may be equipped.

Components in the load-forecasting group perform an algorithm of predicting several types of loading amount through various load patterns and existing data.

For example, if loads included in the power grid are classified by type, a component for performing an algorithm for predicting hourly power consumption by receiving the corresponding load type and amount information, which may be recorded in the database 180, may be equipped.

For example, a component for performing an algorithm for predicting hourly power consumption of a specific load from accumulated hourly power consumption for a certain period of time by receiving previous accumulated power consumption information of the specific load may be equipped.

Components in the analysis group performs an algorithm for analyzing optimal operating conditions through analysis of feasibility of each site and analysis of the grid, etc. and planning superordinate grid and electricity transactions, etc.

For example, a component for performing an algorithm for analyzing an hourly economic value of power applied to an internal power grid, charging the power to an ESS equipped in the power grid at a time zone with low economic value of the analyzed power, and discharging the power at a time zone with high economic value.

For example, a component for performing an algorithm for confirming a charge schedule for expecting hourly power purchasing amount of an electricity supplier as a superordinate grid when selling power to the electricity supplier, and selling an ESS equipped to the power grid to allow power to be sold at a time of the highest purchasing amount.

Components in the power generation planning group perform an algorithm for drawing an optimal power generation schedule of a controllable power source, such as ESS and diesel, through data of prediction of power generation, including generation of PT, WT, etc., load prediction, and the controllable power sources, including ESSs and diesels.

For example, a component for performing an algorithm for confirming an optimal power generation schedule of a controllable diesel power generator by collecting and analyzing charging schedule for the ESS equipped in the power grid, expected power consumption information of each load, expected power generation information of renewable energy sources such as PV, WT, etc. may be equipped.

Components of the operation set may be more specifically subdivided into a power-compensating group for performing a function of compensating power in the power grid; a grid control group for controlling a configuration of the power grid; a dispatch group for controlling output of the power source depending on the optimal power generation schedule and performing load shedding and linkage; and a monitoring group for monitoring operating state of the power grid.

More specifically, the power-compensating group may be classified into a Control group P for compensating active power, a control group Q for compensating inactive power, and a control group S for compensating apparent power.

Components in the control group P perform an algorithm including a function for compensating or changing active power other than the operation schedule.

For example, a component for performing an algorithm for calculating Peak/Valley of power supply by receiving a measurement value of active power of a point of common coupling (PCC) and compensating active power thereof may be equipped.

Components in the control group Q perform an algorithm including a function for compensating or changing inactive power other than the operation schedule.

For example, a component for performing an algorithm for calculating power factor by receiving a measurement value of the power factor of a PCC and compensating inactive power thereof may be equipped.

Components in the control group S perform an algorithm including a function for compensating or changing apparent power other than the operation schedule.

For example, a component for performing an algorithm for calculating Peak/Valley of power supply by receiving a measurement value of apparent power of a PCC and compensating apparent power thereof may be equipped.

Components in the grid control group perform an algorithm for controlling grid configuration depending on a situation such as independent operation, grid re-connection, emergency operation, etc.

For example, if site environment conditions designated in policy are satisfied at a normal state, an algorithm for controlling signals disconnecting the superordinate grid may be performed.

For example, as a result of monitoring the power grid, if the state is judged to be at an emergent state under which there exists a risk potential, an algorithm for outputting the controlled signals disconnecting the superordinate grid may be performed.

For example, if the site environment or power grid conditions are satisfied after being disconnected with the superordinate grid at the normal or emergent state, an algorithm for reconnecting the disconnected superordinate grid may be performed.

Components included in the dispatch group may perform an algorithm for drawing final output values P and Q and a load shedding value of a controllable distributed power system such as ESS and diesel by considering compensating values P and Q, equipment state such as capacity, whether to operate or SoC, and schedule.

For example, an algorithm for determining and instructing the load shedding of the controllable distributed power system such as ESS and diesel may be performed by considering compensating values P and Q, equipment state such as capacity, whether to operate or SoC, and schedule.

For example, an algorithm for determining and instructing outputted value of the controllable distributed power system such as ESS and diesel may be performed by considering compensating values P and Q, equipment state such as capacity, whether to operate or SoC, and schedule.

Components in the monitoring group perform an algorithm for checking voltage, frequency, and main events through current calculation and state monitoring, etc., and for generating signals to relevant functions upon occurrence of such main events.

For example, if voltage or current exceeds a certain normal range in the power grid, an algorithm for recording an event occurring time and a degree out of the range may be performed.

For example, if the frequency of voltage of the power grid or the AC power generator exceeds a certain normal range, an algorithm for recording the time of occurring the event and the degree out of the range or reporting them to the administrator of the superordinate grid may be performed.

Figure 5:
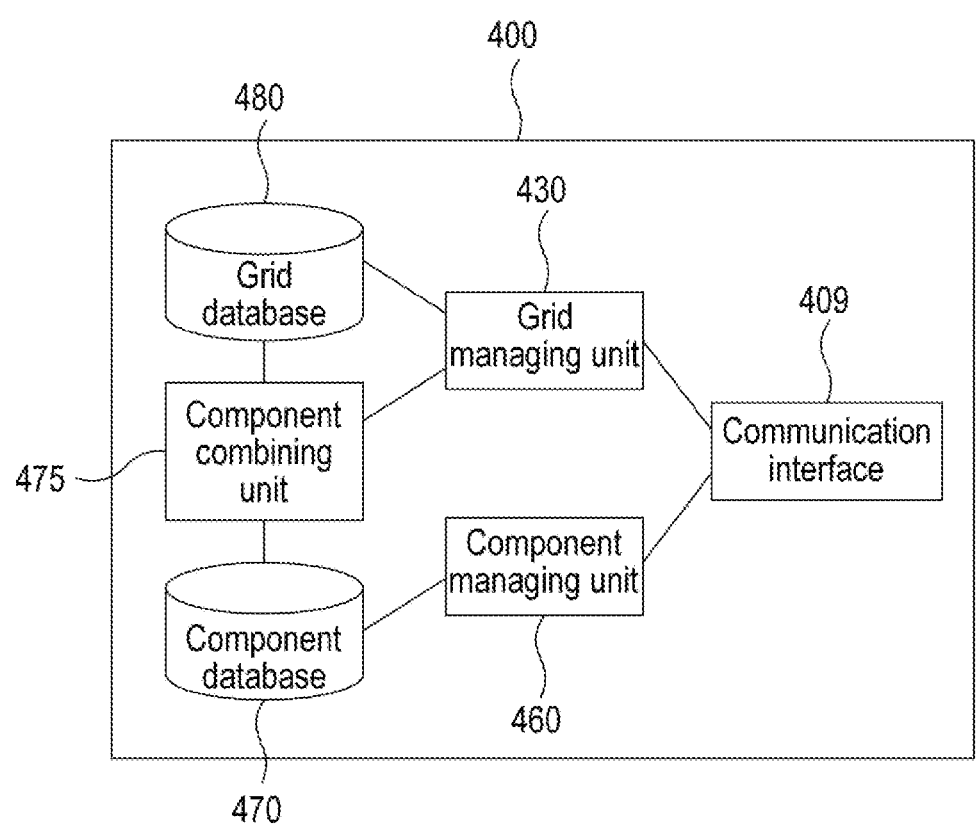
FIG. 5 is a block diagram illustrating a remote supporting server for supporting configuration of components of a power grid controller in accordance with the thought of the present invention.

FIG. 5 is a block diagram illustrating a remote supporting server for supporting configuration of components of a power grid controller in accordance with the thought of the present invention.

The illustrated remote supporting server 400 may comprise: component database 470 for storing components to be transmitted to power grid controllers distributed to several sites; communication interface 409 for performing data communication with the individual power grid controllers; a grid managing unit 430 for performing work of managing a power grid distributed to several sites and its controller; grid database 480 for storing information of managing the power grid distributed to several sites and its controller; a components-combining unit 475 for configuring combinations of components to be provided to the individual power grid controllers; and a component managing unit 460 for managing the components stored in the component database 470.

For example, planning components in the component database 470 illustrated in FIG. 3 and described in the relevant explanation, and operation components illustrated in FIG. 4 and described in the relevant explanation may be classified and stored, and each component may be classified into, and stored in, a plurality of versions depending on the size of the power grid or an operating system.

The communication interface 409 may establish a data communication channel with the communication interface 190 of the power grid controller in FIG. 1.

The grid managing unit 430 stores management information of the power grid as a subject to management in the grid database 480 and may store even information on combinations of components in accordance with the thought of the present invention.

According to the administrator's request, change in the environment conditions of sites where the power grid is installed and change in requirements, the grid managing unit 430 may revise the stored management information, and update even the combinations of components provided to each power grid as revised combinations.

According to the configuration of the combinations of components provided at the beginning of each power grid as well as change in the environment conditions and change in the requirements, the components-combining unit 475 may reconfigure combinations of components to be upgraded to each power grid.

The component managing unit 460 may monitor a result of working the corresponding component in each power grid, evaluate each component stored in the component database 470, and create a plurality of versions of the each component depending on the size of the power grid or the operating system.

In accordance with the implementation, the component managing unit 460 may also support a function of deleting and adding components stored in the component unit 170 of the remote power grid controller in FIG. 1, or changing the order of execution. In this case, the component managing unit 160 in FIG. 1 may be omitted.

It must be noted that the aforementioned example embodiment is for explanation, not for limitation. Besides, it will be understood by those skilled in the art to which the present invention pertains that a variety of example embodiments are possible within the scope of technical thoughts of the present invention.

REFERENCE NUMBERS

100: Power grid controller
140: Processing module
160: Component managing unit
170: Component unit
190: Communication interface
300: Power grid
400: Remote supporting server

INDUSTRIAL AVAILABILITY

The present invention relates to a power grid controller as one of plans for building an integrated infrastructure system to implement several distributed power grids, and is available in the smart grid field.

What is claimed is:

1. A power grid controller, comprising:
   a grid input interface for receiving information on operating state of a power grid;
   a grid output interface for outputting a signal for operating the power grid;
   a communication interface for performing data communication with a remote device;
   a component storage with a plurality of software components for performing individual functions to operate the power grid; and
   for executing the components to process a work required to operate the power grid,
   wherein the component processor is configured to store the components received from a remote management system server, delete or add the stored components, and change an order of execution, and
   wherein the component processor is further configured to delete or add the components in the component storage or change the order of execution depending on a country or an administrative area where the power grid is installed and serviced or an electricity supplier of a superordinate power grid.

2. The controller of claim 1, wherein the component processor processes an individual work required to operate the power grid in an implementation order of components classified by a process function, and transmits a result of processing the individual work.

3. The controller of claim 1, wherein the components are classified into a planning set for predicting power generation situations and load situations and planning operation strategies and operation schedules, and an operation set of controlling elements of the power grid depending on the operation schedules.

4. The controller of claim 3, wherein the planning set includes: a power generation-forecasting group for forecasting power generation amount of each power source included in the power grid from weather information received from outside and accumulated weather information; a load-forecasting group for forecasting power consumption of each load in the power grid from accumulated power consumption information; an analysis group for analyzing electricity transactions from a superordinate grid; and a power generation planning group for determining an optimal power generation schedule of a controllable power source.

5. The controller of claim 3, wherein the operation set includes: a power-compensating group for performing a function of compensating power in the power grid; a grid control group for controlling a configuration of the power grid; a dispatch group for controlling output of a power source depending on an optimal power generation schedule and performing load shedding and linkage; and a monitoring group for monitoring operating state of the power grid.

6. A power grid control system, comprising:
- a grid power controller including:
  - a grid input interface for receiving information on operating state of a power grid;
  - a grid output interface for outputting a signal for operating the power grid;
  - a communication interface for performing data communication with a remote device;
  - a component storage with a plurality of software components for performing individual functions to operate the power grid; and
  - a component processor for executing the components to process a work required to operate the power grid; and
- a remote supporting server, including:
  - a component database for storing components to be transmitted to the power grid controller;
  - a communication interface for performing data communication with the power grid controller;
  - a grid managing processor for performing a work of management of the power grid and the power grid controller;
  - a grid database for storing information on management of the power grid and the power grid controller;
  - a components-combining processor for configuring combinations of components to be provided to each power grid controller; and
  - a component managing processor for managing the components stored in the component database.

\* \* \* \* \*